United States Patent [19]
Markle, Jr.

[11] Patent Number: 5,501,030
[45] Date of Patent: Mar. 26, 1996

[54] FISHING HOOK HOLDER

[76] Inventor: Franklin C. Markle, Jr., 840 Birchrun Rd., Chester Springs, Pa. 19425

[21] Appl. No.: 299,155

[22] Filed: Aug. 31, 1994

[51] Int. Cl.⁶ ................................................. A01K 97/06
[52] U.S. Cl. .................... 43/57.1; 206/315.11; 206/443
[58] Field of Search ................................. 206/443, 379, 206/373, 315.11, 364, 366, 436; 43/25.2, 25, 57.1, 57.2, 54.1

[56] References Cited

U.S. PATENT DOCUMENTS

| | | | |
|---|---|---|---|
| 503,722 | 8/1893 | Lewis | 43/55 |
| 1,523,935 | 1/1925 | Dunlap | 43/57.1 |
| 2,508,820 | 5/1950 | Fraley | 43/57.1 |
| 3,583,556 | 6/1971 | Wagner | 206/373 |
| 4,366,641 | 1/1983 | Price | 224/920 |
| 4,813,173 | 3/1989 | Abbotoy | 43/57.1 |
| 5,092,463 | 3/1992 | Dees | 206/373 |

FOREIGN PATENT DOCUMENTS 1108222  1/1956  France ..................... 43/57.1

*Primary Examiner*—P. Austin Bradley
*Assistant Examiner*—James Miner

[57] ABSTRACT

Disclosed is a device for conveniently holding or storing snelled hooks which does not utilize mechanical means of any kind. The device of the present invention consists of an elongated, substantially tubular shaped member, the interior of which is subdivided into a plurality of individual hollow compartments, each of which are of a size to accommodate a leader of a snelled hook and, in the preferred embodiment, the point of at least one snelled hook. In practice, the user of the device of the present invention will insert a fish hook's leader into an inner tubular compartment and the points of the hook into the ends of nearby tubular compartment. The ends of the holder can be covered to thereby store a snelled hook therein.

3 Claims, 1 Drawing Sheet

FISHING HOOK HOLDER

This invention relates to a device for holding or storing snelled hooks or pre-rigged lures.

The storage of snelled hooks in a tackle box is a constant problem for the fisherman. The leaders become entangled with the other tackle, and retrieving the hooks in a expedient fashion presents a troublesome problem. The prior art listed below addressed solving this problem in a number of ways.

DESCRIPTION OF THE PRIOR ART

U.S. Pat. No. 4,052,810, Stevenson (Oct. 11, 1977), teaches a snelled hook holder which includes a penetratable member for releasably receiving the point of a hook, a spacer member in the form of a bent wire in a coil spring mounted transversely of the penetratable member for receiving and holding the leader in tension between adjacent coils of the spring.

U.S. Pat. No. 4,040,202, Wille (Aug. 6, 1977), teaches a generally open frame member which has a series of coil springs attached by their ends to threaded studs on the interior of the frame. The opposite ends of the springs are each opened for the attachment of one end of a material, the other end of which is fastened, under tension of the spring, to a spaced fixed attachment on or to an oppositely mounted spring. Each frame is adapted to be attached to one or more identical frames by demountable hinges and the two outer most frames are provided with covers to give a completely enclosed case.

U.S. Pat. No. 4,005,541, Henrichsen (Feb. 1, 1977), teaches a tender which has an elongated base and a pair of engaging blocks attached near one end of said base and tension spring means attached near the other end. The tender is particularly useful for holding materials wherein more than one material is tied to one frame. The base is flat and preferably rigid with a clip attached to the spring means to engage the loop of the leader. The blocks have soft engaging means, such as cork, on an edge opposite the spring. The hook engaging blocks are preferably moveable longitudinally so that they may be adjusted to hold a particular length of material. The tender may be hinged in the center of the fold more compactly and may be incorporated into a box, either externally or internally. The base may be equipped with a pair of elongated legs and a holder to form a tender.

U.S. Pat. No. 4,249,707 teaches a dispenser for storing and dispensing material which includes an elongated, substantially rectangular member for receiving the material onto said member. Said member has a first round end and a second round end, each of which are in the shape of a double sided flange having a thin side wall and a thick side wall. The dispenser also includes a spring which is embedded in the thick side wall of the first rounded end in which it is disposed orthogonally to the elongated, substantially rectangular member so that the end of the material may be secured within the coil of the spring. There is also a longitudinal cavity within the member and a protuberance, matched to the longitudinal cavity and disposed on the opposite side of the member, so that the dispenser may be coupled to another identical dispenser thereby achieving a modular dispenser for a variety of material of different sizes.

While the hook holders described in the above prior art all are useful in fulfilling their intended function of holding snelled hooks, they all employ tension springs and are therefore both potentially dangerous to the user or are more prone to break then, for example, a holder that does not employ tension spring means. In addition, some of the above holders, and many other holders available to the public, keep the hooks more or less open to the elements and consequently the hooks may be prone to rusting. Furthermore, some of the holders described above are complicated in function and may present problems in operation, particularly to younger fishermen.

It is accordingly an object of the present invention to provide a device for holding snelled hooks which is simple in operation, which does not employ spring or other mechanical means, and which minimizes exposure to the elements, in a manner which is improved over the prior art devices.

SUMMARY

By this invention, there is provided a device for conveniently holding or storing snelled hooks (which are defined herein as fish hooks that have one or more points and a leader extending therefrom) which does not employ tension springs and in fact does not utilize mechanical means of any kind. The device is simple in function. Basically, the holder of the present invention consists of an elongated, substantially tubular shaped member having two open ends, the interior of which tubular shaped member is subdivided into a plurality of individual hollow compartments, each having two open ends and with each individual hollow compartment being of a size suitable to accommodate the leader of a snelled hook and, in the preferred embodiment, the point of at least one snelled hook. In practice, the user of the device of the present invention will insert a fish hook's leader into such a inner tubular member and the point or points of the hook into nearby inner tubular members to thereby store a snelled hook within the holder of the present invention.

The invention is now further described with reference to the accompanying drawings.

DRAWINGS

The drawings are not necessarily drawn to scale.

DESCRIPTION

Figure 1A:
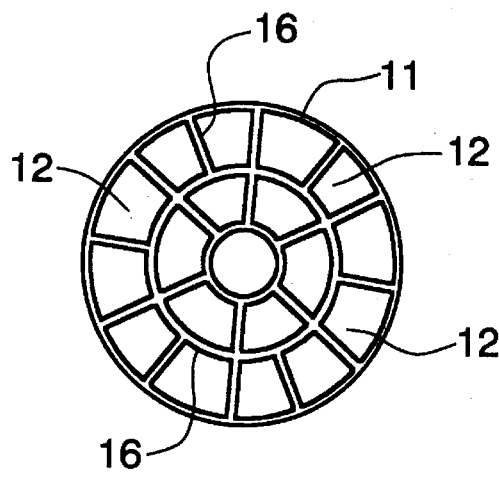
FIG. 1a is an end view of one embodiment of the device of the present invention.
Figure 1B:
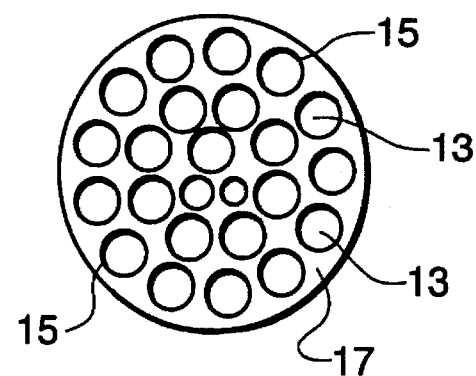
FIG. 1b is an end view of another embodiment of the device of the present invention.
Figure 2:
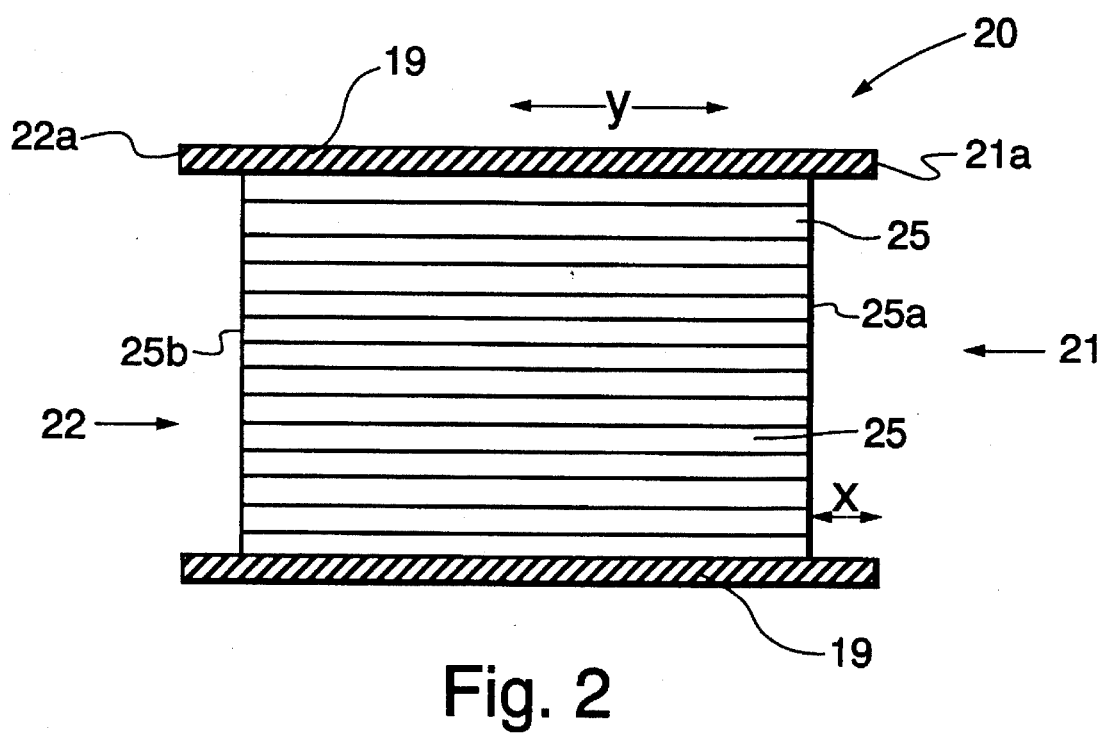
FIG. 2 depicts a side view, in cross-sectional cut away form, of the fish hook holder of the present invention.

FIG. 1a depicts an end view of one end of the device of the present invention. Snelled fish hook holder 10 is comprised in part of an external tubular housing 11, within which there is located a plurality of internal, hollow, substantially tubular members 12, the longitudinal axis of each of which extends substantially parallel to the longitudinal axis of external tubular housing 11. Although the depicted end of holder 10 contains 19 inner members, it is understood that the exact number of interior tubular compartments may vary considerably. Each internal tubular member or compartment 12 is of a size sufficient to accommodate a fish hook leader, and will also, in the preferred embodiment, have a cross sectional area that is sufficient to hold one of the points of a fish hook. The open ends of tubular members 12 are in fact recessed from the corresponding open end of holder 10, as depicted in FIG. 2 and explained in more detail below. It is understood that the other open end, not depicted in FIG. 1a, of holder 10 will be substantially identical to what is depicted so that snelled fish hooks can be stored in both ends of the holder of the present invention. FIG. 1b depicts another embodiment of the present invention, in which most of the inner tubular compartments 13 have a different cross-sectional shape than that of the inner tubular compartments 12. Moreover, in FIG. 1b there are gaps 17 between compartments 14, with each compartment having its own distinct outer wall 15. In the embodiment depicted in FIG. 1a, most of the outer walls 16 of the compartments 12 are shared with other compartments, with the compartments located adjacent to the housing 11 using such housing as one of their defining walls. Obviously, the design of FIG. 1a would permit placing more inner compartments within a given cross sectional area.

FIG. 2 depicts a side view, in cross-sectional cutaway form, of the fish hook holder 20 of the present invention. Holder 20 consists of a outer tubular structure 19 having longitudinal open ends 21 and 22, with each end having, respectively, outer edges 21a and 22a. Fish hook holder 20 contains a plurality of inner hollow tubular members 25 that extend through the length of holder 20. Each inner tubular member has one outer open edge or end 25a positioned proximate to holder 20's open longitudinal end 21, and another open outer edge or end 25b positioned proximate to open longitudinal end 22. The edges or ends 25a and 25b of inner tubular members 25 are slightly offset, by distance x, from outer edges 21a and 22a, to allow room for a cover means such as a cap (not depicted) to fit over each of ends 21 and 22 and also to preferably permit the fishhooks being stored within holder 20 to fit within the confines of the holder. In either design, it is appreciated that leaders could be inserted into both open ends 21 and 22, and thereafter into the open ends of the inner compartments, of the holder of the present invention. It can be appreciated from FIG. 2 that the longitudinal axis, which is shown by directional arrows Y, of each the inner tubular members 25 are parallel to each other and are also parallel to the longitudinal axis of holder 20.

In the practice of the present invention, fish hook leaders are first inserted within an inner tubular member via an open end of said member and each point of a snelled hook is preferably inserted within an open end of an inner tubular member adjacent thereto. The hooks attached to the leaders will therefore be positioned either in the inner tubular members or resting on top of the outer edges of the inner tubular structures. All of the hooks will thus be easily visible to the fisherman and the leaders will remain tangle free. When particularly long leaders are used the leaders can be inserted completely through the inner tubular member in which they were first inserted and then into another, preferably adjacent, inner tubular member from the opposite end of the fishing hook holder. Alternatively, the leaders may be folded over one or several times and inserted into the inner tubular member.

It is understood that the cross sectional (through the width of the tubes and therefor perpendicular to the tubes' longitudinal axis) design of the inner tubular members can be of various shapes and sizes, with the only requirement being that such shapes are convenient for easily inserting and storing the leaders without having a problem of knots forming in the monofilament or the leaders becoming entangled with one another within the holder. The inner tubular members should be of a sufficient size, through their cross section, so that they should at least be able to accommodate the point of a fish hook. Obviously, different sizes of holders can be utilized for different size hooks. In addition, the inner tubular members within a given holder do not have to be identical in their cross-sectional shapes or sizes. In fact, it may be desirable, in order to store a variety of sizes of hooks within a holder, to utilize a holder having inner tubular members having a variety of shapes and sizes. Likewise, the cross sectional shape, through its width, of the holder of the present invention can be of a configuration other than circular. For example, an oval or even a square cross-sectional design might be more desirable in certain applications because it would help impede the holder from rolling. This can be an extremely desirable feature if the holder is placed in the bottom of a boat during use.

The dimensions of both the outer and inner tubular structures vary with the size of the fish hooks to be stored and/or the length of the leader material that is used to snell the hooks. Practically speaking, the size of the holder should be convenient for tackle boxes. On the average, a tube of approximately one inch to one and one-quarter inches in diameter and ten to fourteen inches in length will be very convenient for most applications. Holders having the above dimensions will generally have the capability of storing from about 24 to 48 snelled fish hooks depending on the size of the hooks and the length of the leaders and whether fish hooks are to be stored in both ends of the holder. For larger size hooks and leaders and where pre-rigged lures are used, a holder having approximately a two inch diameter and a length of about 24 inches might be more desirable.

Typically, the open ends or edges of the inner member should be recessed. A preferred distance for the depth of the recess is about three-quarters inch on each end from the outer open ends of the holder, although, of course, this distance may vary depending on the size of the hooks that the structure is designed to store. Such a recess is necessary, as indicated above, in order to have room to accommodate the fish hooks so that each end of the holder can be covered, via suitable end cover means. Ideally each inner member should have a cross sectional (i.e., taken perpendicular to the longitudinal axis) size sufficient to accommodate the points of the hooks being stored in the holder. When a leader for a snelled fish hook is placed within a specific inner compartment the points of the hook will be placed within adjacent or nearby inner compartments. It is obviously desirable to place the hooks in such a fashion in order to reduce the possibility of a person being injured on a hook's exposed point. The inner members and the recess should be dimensioned, therefore, so that the point of a hook will fit into the open ends of the members with a minimum of movement and to permit the remaining portion of the hooks to fit within the confines of the holder to thereby permit the end caps to fully enclose the ends of the outer tube to fully cover the hooks. This will also, among other things, prevent moisture from entering the hook holder.

In any event, the size of the holder can be sized according to the fish hooks that are intended to be stored therein, and therefore the specific dimensions of the holder are not to be considered to be crucial to the present invention.

Although primarily designed for fishing hooks and pre-rigged lures, it is anticipated that other items can conceivably be stored in the device of the present invention.

As can be appreciated for the foregoing description, the snelled fish hook holder of the present invention is simple in construction and allows one to store numerous snelled fish hooks and/or pre-rigged lures safely and conveniently within a simple device. Storing and recovering the snelled hooks is easy and convenient. The invention has been described with respect to several preferred embodiments with the understanding that many modifications may be made without departing from the spirit and scope of the invention.

What is claimed is:

1. A holder device for snelled fish hooks, each fish hook having at least one point and a leader extending therefrom, said device comprising an outer, essentially tubular, structure having two outer open ends, each open end adaptable to receive one or more snelled fish hooks, said outer tubular structure having in its interior a plurality of essentially tubular, hollow inner members, each inner member having two open ends and each inner member being of a length less than the length of the outer tubular structure so that there is a cavity between each open end of each inner tubular member and the corresponding open end of the outer tubular structure, the depth of said cavity being the axial distance between the open end of each inner tubular member and the open end of the outer tubular structure to which it is in closest proximity, wherein the longitudinal axis of each of said inner tubular members extends substantially parallel to the longitudinal axis of the outer tubular structure, wherein each tubular member is sized to accommodate the leader of a snelled fish hook and each cavity is sufficiently sized to accommodate a snelled fish hook.

2. The holder device of claim 1, wherein the internal cross-sectional area of each inner tubular member is sized to accommodate at least one point of a fish hook stored within said device.

3. The holder device of claim 1, wherein each open end of the inner tubular members are is recessed at least three-quarters of an inch from the corresponding end of the outer tubular structure.

* * * * *